US011187149B2

(12) United States Patent
Kobielski et al.

(10) Patent No.: US 11,187,149 B2
(45) Date of Patent: Nov. 30, 2021

(54) CASE-INTEGRATED TURBOMACHINE WHEEL CONTAINMENT

(71) Applicant: Transportation IP Holdings, LLC, Norwalk, CT (US)

(72) Inventors: Louis Kobielski, Sherman, NY (US); Baris Uygun, Erie, PA (US); Adam Felton, Grove City, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 63 days.

(21) Appl. No.: 16/694,067

(22) Filed: Nov. 25, 2019

(65) Prior Publication Data

US 2021/0156304 A1 May 27, 2021

(51) Int. Cl.
| | |
|---|---|
| *F02C 6/12* | (2006.01) |
| *F01D 25/16* | (2006.01) |
| *F01D 25/24* | (2006.01) |
| *F02B 37/00* | (2006.01) |
| *F16C 19/18* | (2006.01) |
| *F04D 25/04* | (2006.01) |

(52) U.S. Cl.
CPC ............... *F02C 6/12* (2013.01); *F01D 25/16* (2013.01); *F01D 25/24* (2013.01); *F02B 37/00* (2013.01); *F04D 25/04* (2013.01); *F05D 2220/40* (2013.01); *F16C 19/184* (2013.01)

(58) Field of Classification Search
CPC .. F02C 6/12; F01D 25/16; F01D 25/24; F02B 37/00; F04D 25/04; F05D 2220/40; F16C 19/184
See application file for complete search history.

(56) References Cited

U.S. PATENT DOCUMENTS

| | | | | |
|---|---|---|---|---|
| 5,201,847 | A * | 4/1993 | Whidden | F01D 9/023 415/177 |
| 6,638,007 | B2 * | 10/2003 | Bartholoma | F04D 29/4206 415/173.4 |
| 8,251,650 | B2 * | 8/2012 | Ibaraki | F04D 29/4206 415/200 |
| 9,200,567 | B2 * | 12/2015 | Parker | F01D 21/045 |
| 9,555,470 | B1 * | 1/2017 | Heneveld | F01D 5/147 |
| 9,758,240 | B2 * | 9/2017 | Brown | B64C 21/06 |
| 2015/0034029 | A1 * | 2/2015 | Obenaus | F02B 37/00 123/41.82 R |
| 2016/0069208 | A1 * | 3/2016 | Parker | F02C 6/12 415/9 |
| 2016/0153287 | A1 * | 6/2016 | Roach | C25D 1/00 415/119 |
| 2018/0230855 | A1 * | 8/2018 | Heeter | B29C 70/00 |
| 2020/0157968 | A1 * | 5/2020 | Braun | F01D 25/24 |
| 2021/0025325 | A1 * | 1/2021 | Kobielski | F04D 29/624 |
| 2021/0025405 | A1 * | 1/2021 | Kobielski | F04D 29/403 |

FOREIGN PATENT DOCUMENTS

EP        1083300 B1    11/2006

* cited by examiner

*Primary Examiner* — Jesse S Bogue
(74) *Attorney, Agent, or Firm* — McCoy Russell LLP (57) ABSTRACT

Various systems and methods are provided for a shroud of a turbomachine. In one example, a turbomachine includes a case and a rotor rotatably coupled to the case and configured to transfer energy between the rotor and a working fluid. The case includes a shroud housing the rotor, the shroud including an inner shell, an outer shell, and a lattice structure positioned between the inner shell and the outer shell.

20 Claims, 5 Drawing Sheets

CASE-INTEGRATED TURBOMACHINE WHEEL CONTAINMENT

BACKGROUND

Technical Field

The disclosure relates to turbomachine casings and providing turbomachine wheel containment.

Discussion of Art

Engine systems, such as engine systems of locomotives, may be equipped with a turbocharger, which may allow an engine to receive boost air during some engine operating parameters to increase power output and fuel efficiency. Turbochargers may be equipped with a variety of external add-ons to manage thermal stresses induced by hot exhaust gases, to manage containment in an event of turbine wheel degradation (e.g., burst), to support a shaft of the turbocharger, and to couple all components of the turbocharger to one another.

Brief Description

In one embodiment a turbomachine includes a case and a rotor rotatably coupled to the case and configured to transfer energy between the rotor and a working fluid. The case includes a shroud housing the rotor, the shroud including an inner shell, an outer shell, and a lattice structure positioned between the inner shell and the outer shell.

DETAILED DESCRIPTION

The following description relates to examples of a system for an engine comprising a turbomachine (e.g., turbocharger) and associated case that includes a shroud. The shroud may house a turbine of the turbomachine, which includes a turbine wheel (also referred to as a turbine rotor). In other examples, the shroud may house a compressor of the turbomachine, which includes a compressor wheel (also referred to as a compressor rotor). The shroud may include an inner shell, an outer shell, and a lattice structure positioned between the inner shell and the outer shell. Other examples of shrouds and/or turbomachine cases may attempt to contain turbine or compressor wheel failures by manufacturing multiple parts (e.g., twenty or more separate components) that are bolted or otherwise coupled to one another. However, these examples may introduce points of weakness (e.g., joints) and incur manufacturing costs associated with separately constructing add-on components. The disclosed approach may eliminate add-on containment shields and reduce part counts for turbomachine cases by integrating a containment shroud with a case (which case may optionally include a bearing case, turbine case, and/or compressor case) in a monolithic and/or seamless manner. The disclosed approach may also provide increased structural integrity for containing wheel fragments due to the inclusion of a lattice structure in the integrated shroud, which increases a number of layers of material while also reducing weight relative to shrouds formed only of solid material.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the disclosure.

FIGS. 1-5C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2-5C are drawn approximately to scale, although other dimensions or relative dimensions may be used.

Figure 1:
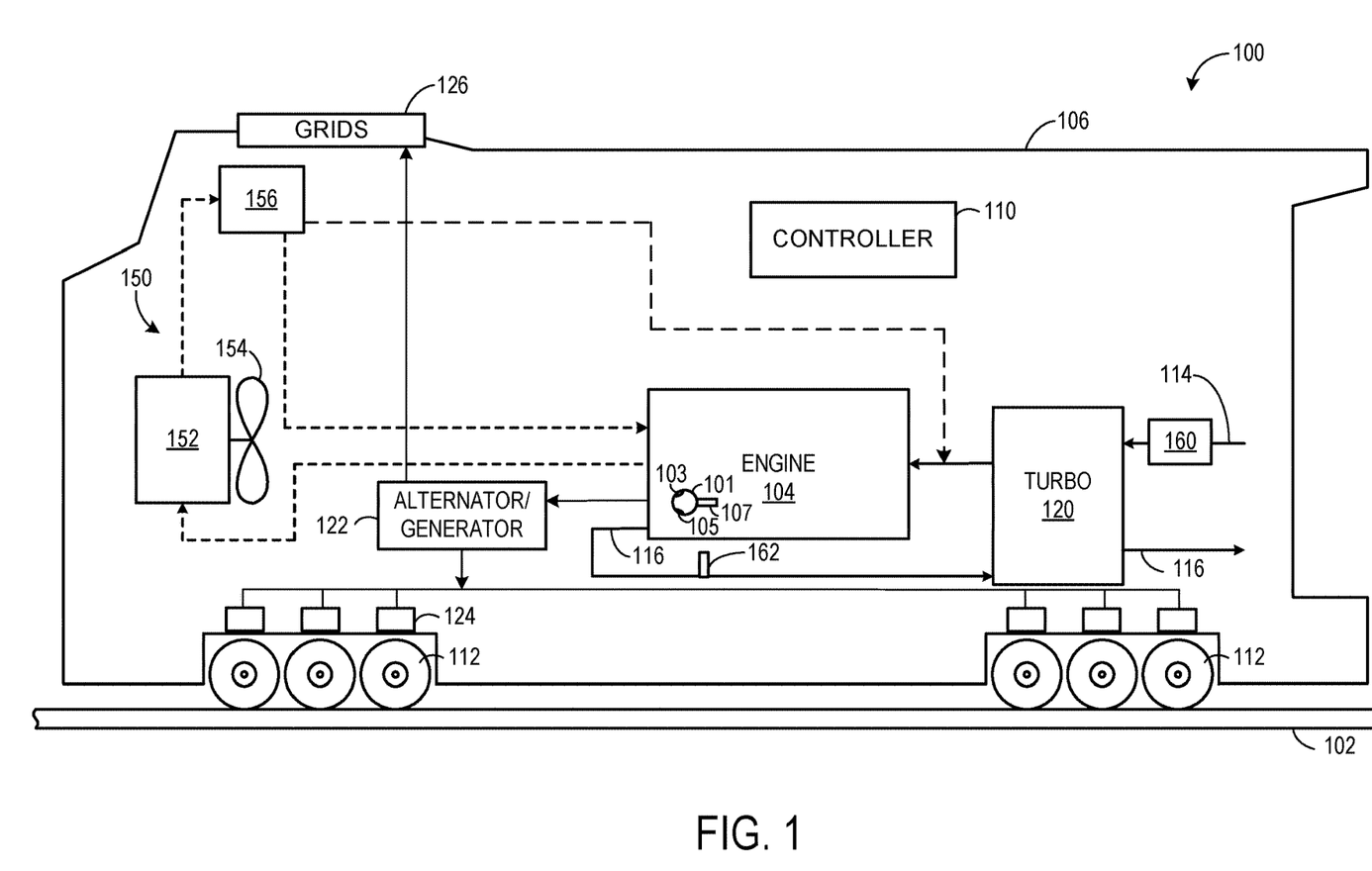
FIG. 1 shows a schematic diagram of a vehicle with an engine comprising a turbocharger arrangement, according to an embodiment of the present disclosure.

FIG. 1 shows an embodiment of a system in which a turbocharger arrangement may be installed. Specifically, FIG. 1 shows a block diagram of an embodiment of a vehicle system 100, herein depicted as a rail vehicle 106 (e.g., locomotive), configured to run on a rail 102 via a plurality of wheels 112. As depicted, the rail vehicle 106 includes an engine 104. The engine includes a plurality of cylinders 101 (only one representative cylinder shown in FIG. 1) that each include at least one intake valve 103, exhaust valve 105, and fuel injector 107. Each intake valve, exhaust valve, and fuel injector may include an actuator that may be actuated via a signal from a controller 110 of the engine 104. In other non-limiting embodiments, the engine 104 may be a stationary engine, such as in a power-plant application, or an engine in a marine vessel or other off-highway vehicle propulsion system as noted above.

The engine receives intake air for combustion from an intake passage 114. The intake passage comprises an air filter 160 that filters air from outside of the rail vehicle. Exhaust gas resulting from combustion in the engine is supplied to an exhaust passage 116. Exhaust gas flows through the exhaust passage, and out of an exhaust stack of the rail vehicle. In one example, the engine is a diesel engine that combusts air and diesel fuel through compression ignition. In another example, the engine is a dual or multi-fuel engine that may combust a mixture of gaseous fuel and air upon injection of diesel fuel during compression of the air-gaseous fuel mix. In other non-limiting embodiments, the engine may additionally combust fuel including gasoline, kerosene, natural gas, biodiesel, or other petroleum distillates of similar density through compression ignition (and/or spark ignition).

In one embodiment, the rail vehicle is a diesel-electric vehicle. As depicted in FIG. 1, the engine is coupled to an electric power generation system, which includes an alternator/generator 122 and electric traction motors 124. For example, the engine is a diesel and/or natural gas engine that generates a torque output that is transmitted to the alternator/generator which is mechanically coupled to the engine. In one embodiment herein, the engine is a multi-fuel engine operating with diesel fuel and natural gas, but in other examples the engine may use various combinations of fuels other than diesel and natural gas.

The alternator/generator 122 produces electrical power that may be stored and applied for subsequent propagation to a variety of downstream electrical components. As an example, the alternator/generator 122 may be electrically coupled to a plurality of traction motors and the alternator/generator may provide electrical power to the plurality of traction motors. As depicted, each of the plurality of traction motors is connected to one of the plurality of wheels to provide tractive power to propel the rail vehicle. One example configuration includes one traction motor per wheel set. As depicted herein, six traction motors correspond to each of six pairs of motive wheels of the rail vehicle. In another example, alternator/generator may be coupled to one or more resistive grids 126. The resistive grids may be configured to dissipate excess engine torque via heat produced by the grids from electricity generated by alternator/generator.

In some embodiments, the vehicle system may include a turbocharger 120 that is arranged between the intake passage and the exhaust passage. The turbocharger increases air charge of ambient air drawn into the intake passage in order to provide greater charge density during combustion to increase power output and/or engine-operating efficiency. The turbocharger may include at least one compressor (not shown) which is at least partially driven by at least one corresponding turbine (not shown). In some embodiments, the vehicle system may further include an aftertreatment system coupled in the exhaust passage upstream and/or downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or exhaust aftertreatment systems.

As depicted in FIG. 1, the vehicle system further includes a cooling system 150 (e.g., engine cooling system). The cooling system circulates coolant through the engine to absorb waste engine heat and distribute the heated coolant to a heat exchanger, such as a radiator 152 (e.g., radiator heat exchanger). In one example, the coolant may be water. A fan 154 may be coupled to the radiator in order to maintain an airflow through the radiator when the vehicle is moving slowly or stopped while the engine is running. In some examples, fan speed may be controlled by the controller. Coolant which is cooled by the radiator may enter a tank (not shown). The coolant may then be pumped by a water, or coolant, pump 156 back to the engine or to another component of the vehicle system.

The controller 110 may be configured to control various components related to the rail vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of rail vehicle operation. In some examples, the controller may include more than one controller each in communication with one another, such as a first controller to control the engine and a second controller to control other operating parameters of the locomotive (such as tractive motor load, blower speed, etc.). The first controller may be configured to control various actuators based on output received from the second controller and/or the second controller may be configured to control various actuators based on output received from the first controller.

The controller may receive information from a plurality of sensors and may send control signals to a plurality of actuators. The controller, while overseeing control and management of the engine and/or rail vehicle, may be configured to receive signals from a variety of engine sensors, as further elaborated herein, in order to determine operating parameters and operating conditions, and correspondingly adjust various engine actuators to control operation of the engine and/or rail vehicle. For example, the engine controller may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, engine coolant pressure, or the like. Additional sensors, such as coolant temperature sensors, may be positioned in the cooling system. Correspondingly, the controller may control the engine and/or the rail vehicle by sending commands to various components such as the traction motors, the alternator/generator, fuel injectors, valves (e.g., coolant and/or EGR cooler valve), coolant pump, or the like. For example, the controller may control the operation of a restrictive element (e.g., such as a valve) in the engine cooling system. Other actuators may be coupled to various locations in the rail vehicle.

Herein, description is directed to a turbine of a turbocharger, such as turbocharger 120 shown in FIG. 1, which may be a variable geometry turbine, wherein a throat area of the turbine may be adjusted based on engine conditions. In one example, the engine condition is an engine power level (e.g., notch level) and/or an engine load. As the engine power level decreases, it may be desired to decrease a throat area of the turbine.

In one example, variable geometry turbines may include mechanically movable vanes or stationary vanes with a movable component such as a shroud or other similar device. By moving the vanes or an adjacent component, a throat area of the turbine is adjusted to adjust a speed of airflow through the turbine and increase boost provided by a current level of exhaust gas production. In another example, a plurality of stationary nozzle vanes in a turbine may inject various amounts of air into the turbine nozzle to adjust a throat area of the nozzle through fluidic blocking. A flow control system outside of the turbine may be arranged for the stationary nozzle vanes inside of the turbine. For example, such a system may reduce a number of mechanical components within the turbine. Additionally, the nozzle vanes and flow control system may provide a greater degree of control over adjusting the area of the turbine such that a greater range of boost may be achieved.

For both fixed and variable geometry turbines, mechanical components such as a turbine disc or wheel may move (e.g., rotate) at high speeds (e.g., exceeding 25,000 RPM under some operating conditions). In the event of degradation of the turbine resulting in release of part or the entire turbine disc or wheel, catastrophic damage to the turbine, as well as other system components in the vicinity of the turbine, may occur if the released fragments are not contained.

Some turbochargers may comprise a turbine case housing a turbine wheel, a compressor case housing a compressor wheel, and/or a bearing case surrounding a shaft and associated bearings connecting the turbine wheel to the compressor wheel and arranged between the turbine case and compressor case. The above cases may be separately formed and adjoined (e.g., via bolts, welding, and/or other mechanisms) in some examples. In other examples, one or more of the above cases may be integral with one another (e.g., joined without any seams therebetween) to form a combined turbocharger case that includes any two or more of the turbine case, the bearing case, and the compressor case. A nozzle ring with vanes may be integrated with one or more of the above cases to further decrease the number of individual components. A targeted water cooling system with a plurality of fluidic passages may be disposed across the case(s) to provide cooling to areas of the case(s) that may be exposed to temperature gradients during turbocharger operation.

The case associated with the turbine wheel (e.g., the turbine case and/or a combined turbine, compressor, and/or bearing case) may include a turbine shroud, which is typically configured to provide turbine performance. In order to contain released fragments of the turbine in the event of degradation of the turbine, the turbine shroud may include structures configured to absorb the impact of the released fragments. However, such structures may increase an amount of material used in the turbine shroud, thereby increase cost and weight of the turbine shroud. Furthermore, a solid structure may be unable to withstand the impact of a high-energy fragment release, particularly when the shroud is subject to high temperatures present in the exhaust of an engine. Accordingly, the disclosure provides for a turbine wheel containment structure that is integrated in a turbine case (or combined turbocharger case) that includes lattice structures to decrease weight and increase structural integrity in high-impact regions (e.g., regions that may be subject to high velocity fragment impacts following a turbine degradation event). Likewise, the disclosure provides for a compressor wheel containment structure that is integrated in a compressor case (or combined turbocharger case) that includes lattice structures to decrease weight and increase structural integrity in high-impact regions (e.g., regions that may be subject to high velocity fragment impacts following a compressor degradation event).

Figure 2:
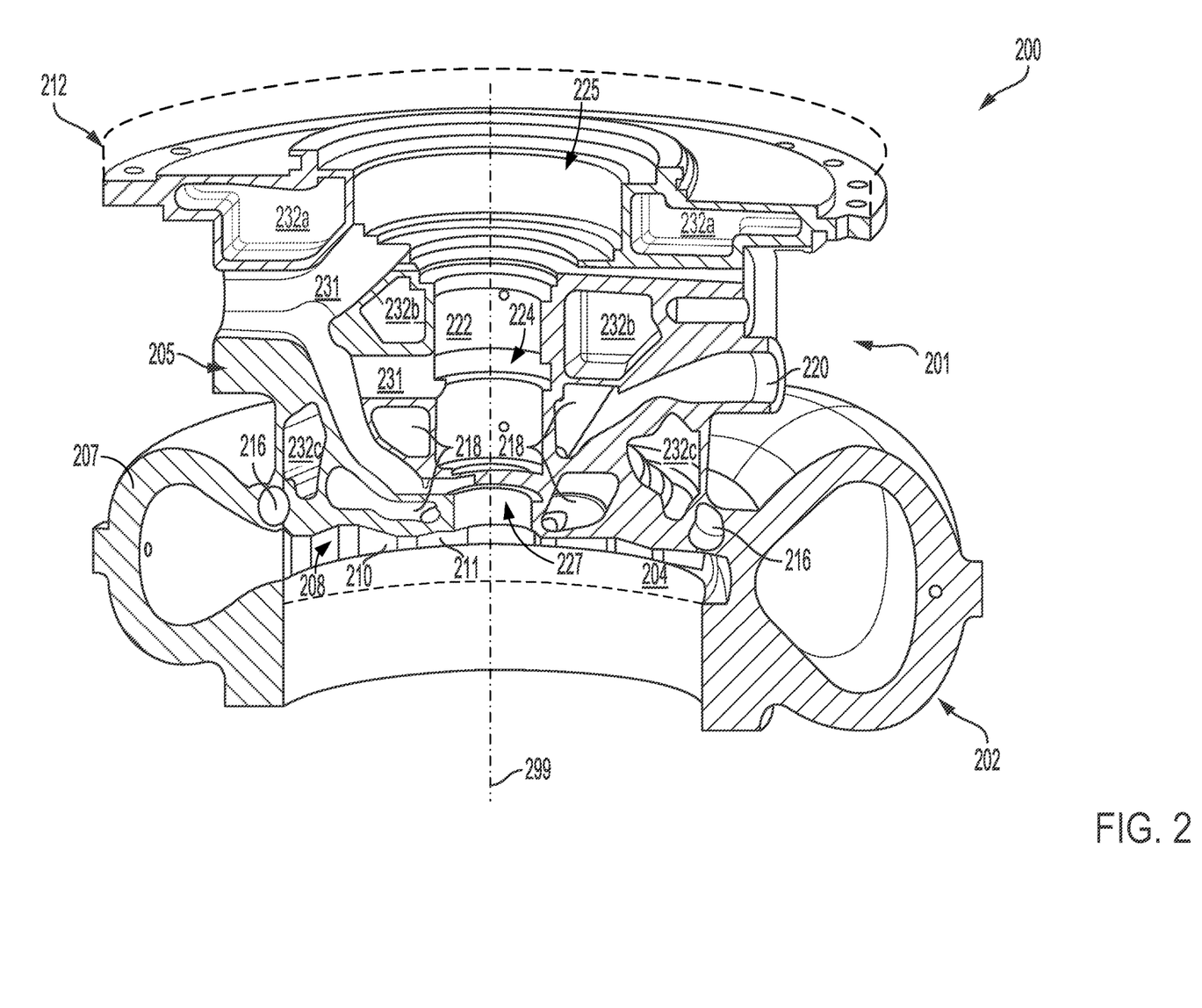
FIG. 2 shows a cross-section view of an example turbocharger arrangement.
Figure 3:
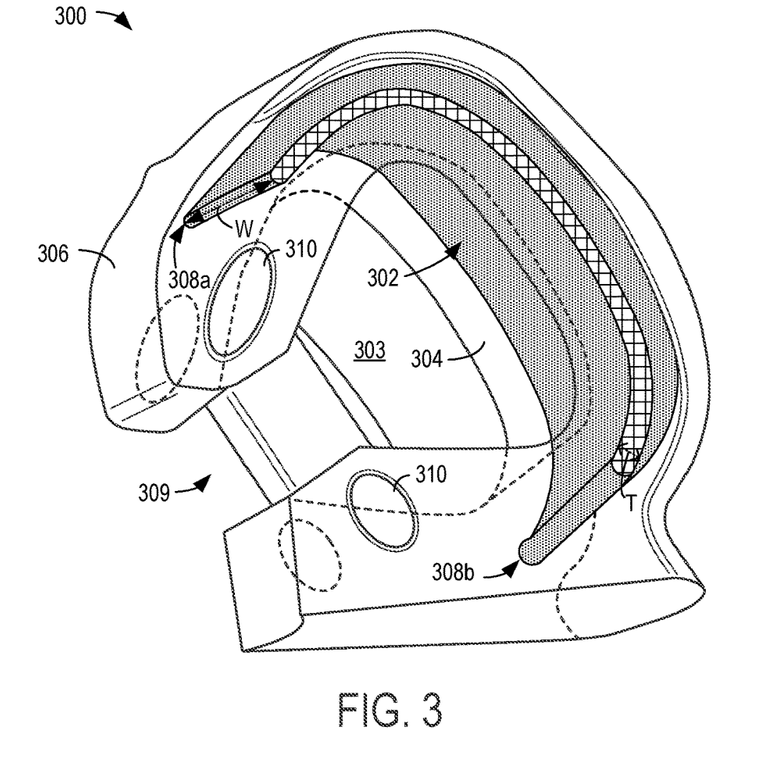
FIG. 3 shows an example of a shroud including lattice structure integrated therein.

An example of the above-described turbine wheel containment structure is illustrated in FIG. 3, however, an example turbocharger and associated case in which the turbine wheel containment structure may be integrated is first described with respect to FIG. 2. In FIG. 2, a first partial, cross-sectional view 200 of a turbocharger 201 of a vehicle is shown. The turbocharger may be used similarly to turbocharger 120 of FIG. 1 and may be included as the turbocharger 120 in the system of FIG. 1, in some embodiments. In one example, the turbocharger 201 is a radial turbocharger. The turbocharger may comprise a turbine 202, including a turbine wheel schematically shown at 204, and a compressor represented schematically at 212, including a compressor wheel. Each of the turbine wheel (e.g., turbine rotor) and compressor wheel (e.g., compressor rotor) may be configured to transfer energy between the wheel/rotor and a working fluid (such as exhaust gas in the case of a turbine wheel and intake air in the case of a compressor wheel). The turbine wheel may be mechanically (e.g., rotationally) coupled to the compressor wheel via a shaft 222 extending parallel to a central axis 299 of the turbocharger. Exhaust gases from an engine of the vehicle (e.g., engine 104 of FIG. 1) may enter the turbine through a turbine inlet (e.g., via a volute, a portion of which is shown at 207) and exit the turbine via a turbine outlet. The volute shape of the exhaust gas inlet may distribute the exhaust gas, in a 360° manner, around the turbine wheel. Prior to exiting the turbine, the exhaust gases may rotate the turbine wheel, the energy of which may be transferred along the shaft 222 and to the compressor wheel. The compressor wheel may compress intake air entering the compressor via a compressor inlet, diffuser, and volute such that compressed air exits the compressor via a compressor outlet.

The turbocharger may comprise one or more bearings, including bearing 224, shaped to allow the shaft to extend therethrough. The bearing(s) may be further shaped to circumferentially surround at least a portion of the shaft. Lubricant may flow into the bearing so that the shaft may be lubricated as it rotates, thereby decreasing mechanical wear experienced by the shaft. In one example, the bearing is a cartridge journal bearing which may comprise a tapered pad and/or tri-load configuration. Herein, the bearing 224 is referred to as journal bearing.

The turbocharger may further comprise one or more thrust bearings. For example, a bearing 225 may be arranged at an end of the shaft, adjacent to the compressor wheel, and may include a thrust bearing. Thus, the thrust bearing may be arranged between the journal bearing and the compressor wheel, along the central axis 299. The thrust bearing may be shaped to support an axial load while also providing lubrication to an interface between the shaft and the compressor wheel. The thrust bearing may be arranged outside of the journal bearing, adjacent to a compressor end of the bearing case (e.g., closer to the compressor case than the turbine case). In some examples, the thrust bearing may at least partially surround a portion of the journal bearing. An additional bearing 227 may be positioned at an opposing end of the shaft from the compressor wheel, adjacent to or near the turbine wheel (e.g., positioned between the journal bearing 224 and the above-described thrust bearing that is positioned at a compressor wheel-end of the shaft 222).

The turbine may further comprise a plurality of vanes 210 arranged adjacent to and surrounding the turbine wheel, around an entire circumference of the turbine wheel, along a nozzle ring 208. Together, the nozzle ring 208 and plurality of vanes 210 may form a nozzle of the turbine (e.g., turbine nozzle), adapted to guide exhaust flow to the turbine wheel 204. The plurality of vanes 210 may be printed onto the nozzle ring 208 in some examples. Additionally or alternatively, the plurality of vanes may be assembled from a mold. In some examples, the plurality of vanes may be fixed and stationary. For example, each vane may be stationary and not move (e.g., pivot, rotate, or translate) relative to the nozzle ring and a central axis of the turbine wheel. Additionally, the plurality of vanes, inside the turbine, may be free of electrical, mechanical, pneumatic, hydraulic, and other types of actuators. In such examples, the plurality of vanes may be free of moving parts, such as a sliding wall, slotted shroud, or other devices configured to adjust the turbine housing geometry. In one example, the vanes may be fixed relative to the nozzle ring such that when the ring rotates the vanes remain stationary. Additionally or alternatively, the vanes may rotate with a rotation of the nozzle ring, but may not rotate independent of the nozzle ring.

The plurality of vanes may be arranged around an entire circumference of the nozzle ring, between the turbine wheel and the exhaust gas inlet. The plurality of vanes may be shaped to adjust a geometry of the turbine based on one or more engine conditions, such as an engine power level. The plurality of vanes may be shaped to inject air through one or more ports 211, which may create a boundary layer of air. The boundary layer of air may reduce an effective throat area of the nozzle, which may adjust an operating point of the turbocharger. In one example, the boundary layer of air adjusts a geometry of the turbine housing to accelerate exhaust gas as the exhaust gas flows between the boundary layer and the turbine blades, making the turbine blades spin faster than the turbine blades would spin otherwise. This may be desired when a current level of exhaust gas production is insufficient (e.g., below a threshold) to meet a current boost demand, such as during a lower engine power level.

A single piece turbocharger case 205 may house (e.g., encapsulate) the turbine 202 and the bearing 224 without the presence of separate turbine case and bearing case. The turbocharger case 205 may abut a compressor case housing the turbocharger compressor.

The turbocharger case 205 may be 3D-printed as a single, monolithic structure without any joints and/or seams. The turbocharger case 205 may include (without any physical boundary therebetween) a turbine region covering the turbine 202 and a bearing region covering the bearing 224 and the shaft 222. A thermal isolation layer (barrier) may be shaped and/or configured to mitigate heat transfer from the turbine to the bearing. One location in which the thermal isolation layer may be arranged is behind the turbine wheel, between the turbine wheel and the bearing such as at a virtual boundary of the turbine region and the bearing region on the turbocharger case 205. The thermal isolation layer is described in more detail in relation to FIG. 4B.

The nozzle ring 208 may be printed onto the turbocharger case at the virtual boundary between the turbine region and the bearing region. The nozzle ring 208 may be attached to and/or may be integrated with the turbocharger case 205 at one end (at the end proximal to the turbocharger) and free standing on an opposing end of the nozzle ring. In this way, during operation of the turbocharger, the free end of the nozzle ring may expand to mitigate build-up of thermal stress, thereby maintaining structural integrity.

A targeted water cooling system with fluidic passages 218 may be integrated into the case 205 to provide cooling to areas of the case such as the virtual boundary of the turbine region and the bearing region that may be exposed to temperature gradients during turbocharger operation. In one example, a single fluidic passage 218 shaped like a helix with an inlet/outlet 220, the coils of the helix may pass through a plurality of cut-outs in the case 205 such that a larger surface area of the turbocharger 201 and the case 205 is cooled by the fluid flowing through the passage 218. By forming a plurality of cut-outs on the case 205, the passage of the cooling system may be well integrated and distributed over the entirety of the case 205. The helix of the cooling system may be radially symmetric around the central axis 299 with two or more coils (passages) integrated into the case 205. By distributing the cooling passage over the entire case, a uniform cooling of the case may be ensured, thereby decreasing thermal stress between parts of the case caused due to a temperature gradient and unequal thermal expansion during operation of the turbocharger. In some examples, portions of the turbocharger may be non-actively cooled, meaning cooled only through thermal conductivity with contacting parts or natural air convection, and not through water cooling or other forced convection.

In examples where the turbocharger is a fluidic variable geometry turbocharger (VGT) wherein the vanes 210 on the nozzle ring 208 are stationary and direct various amounts of air into the turbine nozzle to adjust a throat area of the nozzle through fluidic blocking, a conduit (passage) 216 may be formed in the case 205 via which air may flow to the vanes 210. The conduit 216 may be a hollow tube with a circular cross-section positioned within the case. The conduit 216 may be radially symmetric around the central axis 299 and may be positioned adjacent to the vanes 210 on the nozzle ring 208. The conduit 216 may include an air inlet and an air outlet via which air may be routed to the vanes. In some examples, the conduit 216 may include a plurality of air outlets, each air outlet corresponding to a single vane of the vanes 210. Air flow from an air flow control system to the one or more vanes via the conduit 216 may be adjusted based on engine power level. As an example, the air flow may be decreased with an increase in engine power level while the air flow may be increased with a decrease in engine power level. As disclosed herein, the air flow from the air flow control system may include atmospheric air, other fluidic sources (e.g., other gasses), and/or a mixture of fluidic sources.

The case 205 may further include passageways 231, which may be configured to direct oil or other lubricants to the bearing 224 and/or shaft 222. The passageways 231 may be formed similarly to the coolant passages 218 as open spaces within the case 205 adjacent to solid material of the case 205. The passageways 231 may have fluidic access to the shaft 222 and/or bearing 224 in order to deliver the lubricant thereto. At an opposite end of the passageways 231 from the fluid access points, the passageways may be coupled to an oil or other lubricant source, either directly or via additional passageways outside of the case 205.

At least certain portions 232a-c of the case 205 may be constructed with a lattice structure to provide increased strength and structural integrity to the case 205. Since the case 205 is a single structure enclosing the entire turbine and bearing, the incorporation of portions with a lattice pattern may reduce the overall weight of the case compared to completely solid configurations while improving the strength compared to configurations that include open cavities. The lattice structured portions may be distributed symmetrically around the central axis 299 in selected regions of the case 205 while the remaining part of the case 205 may be a solid structure.

In one example, first lattice portions 232a may be positioned adjacent or near to a compressor wheel and/or a compressor case housing the compressor represented at 212. The first lattice portions 232a may be cross-sections of a continuous or semi-continuous ring around the central axis 299. The dimension (shape, size, and/or diameter) of the continuous ring may vary along the length and/or circumference of the ring to accommodate the turbocharger components (such as the upper portion of the shaft 222) placed in the region. The first lattice portions 232a may be polygonal with one side (adjacent to the compressor case) elongated relative to the other sides. The first lattice portions 232a may extend substantially between an outer wall of the case 205 and an upper region of the shaft 222.

Second lattice portions 232b may be positioned around the shaft 222 and/or adjacent to the bearing 224. The second lattice portions 232b may be cross-sections of a continuous or semi-continuous ring around the shaft 222. The second lattice portions may be pentagonal structures with dimensions varying along the length/circumference of the ring according to the adjoining turbocharger components (such as the shaft 222 and the bearing 224). The second lattice portions 232b may extend between the shaft 222 and the passageway 231 (e.g., in a triangular region formed between the shaft 222 and two trunks of the passageway 231: a trunk leading to an upper bearing near the compressor 212 and a trunk leading to the bearing 224) in at least one region of the case 205.

Third lattice portions 232c may be positioned adjacent to or near the nozzle ring 208 and/or the turbine wheel 204. Accordingly, as shown, the first, second, and third lattice portions are arranged at different radial locations of the case. The first lattice portions 232a may be closest to the compressor (e.g., closer to the compressor than the second and third lattice portions), the third lattice portions 232c may be closest to the turbine (e.g., closer to the turbine than the first and second lattice portions), and the second lattice portions 232b may be positioned between the first and second lattice portions along the central axis 299. The third lattice portions 232c may be cross-sections of a continuous or semi-continuous ring around the central axis 299 (e.g., around the shaft 222 and around the coolant passages 218. The dimension (shape, size, diameter) of the continuous ring may vary along the length and/or circumference of the ring to accommodate the turbocharger components (such as the fluidic passages 218 of the cooling core) placed in the region. The third lattice portions 232c may extend substantially between the outer wall of the case 205 and the shaft 222 (e.g., between the outer wall of the case and a trunk of the passageway 231 leading to a lower bearing near the turbine/nozzle ring). At least a portion of the third lattice portions 232c may be shaped in a complementary manner to a portion of conduit 216.

The third lattice portions 232c may be at least partially aligned with or intersect a central axis of the first lattice portions 232a (e.g., in a direction along the axis of rotation of the shaft 222, which may be coaxial with central axis 299), while the second lattice portions 232b may be positioned closer to the axis of rotation of the shaft 222 than the first and second lattice portions. The first and second lattice portions may only be separated from the shaft 222 and/or an associated bearing (e.g., bearing 225 or bearing 224, respectively) via solid material of the turbocharger case, while the third lattice portion may be separated from the shaft and/or an associated bearing (e.g., bearing 227) via solid material of the turbocharger case and other structures of the turbocharger case (e.g., oil passageway 231 and coolant passages 218). As used herein, description of a first element or region as being "adjacent to" another element or region may be understood to include examples where the two elements/regions are in direct, face-sharing contact as well as examples where the two elements/regions are only separated by solid material of the turbocharger case.

The first, second, and third lattice portions may be hermetically sealed from passages and other openings of the case 205 via inner and outer solid portions sandwiching each of the lattice portions. Thus, fluids and other gasses in the passageways 231 may not enter the lattice portions. Additionally, gasses delivered to the vanes 210 and/or turbine and compressor wheels may not flow through or contact the lattice portions. In this way, the lattice portions are free of liquid and gas.

FIG. 3 shows an example portion of a shroud 300 of a case including a wheel containment structure 302 integrated therein. The wheel containment structure 302 may include and/or be formed of a region of lattice structure following a curvature of a portion of the shroud 300 in order to contain wheel fragments of a wheel/rotor (e.g., turbine wheel 204 of FIG. 2 and/or the compressor wheel of compressor 212 of FIG. 2) in the event of a catastrophic wheel failure. Shroud 300 and wheel containment structure 302 are described below as being included in and/or forming a portion of a turbine case, in order to contain turbine wheel fragments of a turbine wheel. However, it is to be understood that shroud 300 may be included in and/or form a portion of a compressor case, in order to contain compressor wheel fragments of a compressor wheel, in the event of a catastrophic compressor wheel failure. Accordingly, the wheel containment structure 302 may be included in and/or form a portion of a turbine case partway around a volute 303 of the turbine (e.g., volute 207 of case 205 in FIG. 2). However, when shroud 300 is a compressor shroud, the wheel containment structure 302 may be included in and/or form a portion of a compressor case partway around a volute of the compressor.

The shroud 300 may include an inner shell 304 and an outer shell 306, which collectively form a periphery of the shroud. The inner shell 304 may define a boundary or a portion of a boundary of the volute (e.g., by providing a pathway for airflow through the volute). Accordingly, the portion of the turbine shroud 300 represented in FIG. 3 may be a three-dimensional slice of the shroud and/or associated case and the shroud may extend circumferentially around the periphery of the turbine wheel (or compressor wheel) and/or turbocharger. The wheel containment structure 302 may include a region of lattice structure that is adjacent to regions of solid material of the shroud, the region of lattice structure being less dense than the adjacent regions of solid material. An example detail view of a portion of the containment structure 302 is shown in FIG. 4.

Figure 4:
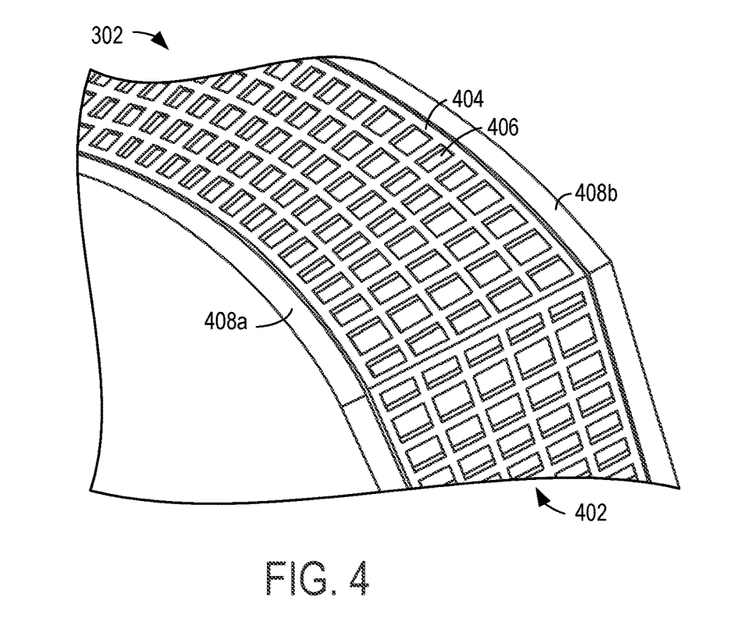
FIG. 4 shows a detailed view of a region of the lattice structure of the shroud of FIG. 3.

Turning briefly to FIG. 4, the example detailed view of the portion of the containment structure 302 illustrates that the containment structure includes a three-dimensional grid 402 of intersecting lines of material 404, creating a plurality of pores 406 between the intersecting lines of material. In one example, the plurality of pores 406 are completely open and free of material. The plurality of pores 406 may be identically sized and shaped in one example. Additionally or alternatively, the intersecting lines of material 404 may be asymmetric and uneven such that one or more pores of the plurality of pores 406 are differently sized and/or shaped from one another. The grid 402 may be sandwiched between an inner layer 408a of solid material and an outer layer 408b of solid material. In some examples, the inner layer and outer layer may be the solid material of the remaining regions of the shroud 300, while in other examples, the inner layer and outer layer may be additional solid material (e.g., a different material than the remaining solid material of the shroud 300). The lines of material 404 forming the grid 402 may include the same material as the inner layer, the outer layer, and/or the solid material of the remaining regions of the shroud 300 in some examples. In other examples, the lines of material 404 may include different material than one or more of the inner layer, the outer layer, and/or the solid material of the remaining regions of the shroud 300. For example, the material of the grid may be more elastomeric/flexible than the solid material of the shroud in order to provide increased impact absorbance. In other examples, the material of the grid may be less elastomeric/flexible than the solid material of the shroud, and the grid structure may be configured to provide additional flexibility/resilience compared to the solid material of the shroud. In some examples, the configuration of the grid structure may be the same throughout the shroud 300 in order to provide uniform manufacturing parameters. In other examples, the configuration of the grid structure may be varied for different regions of the shroud 300 in order to provide additional fragment containment strength in areas that are most likely to receive high impacts from turbine wheel fragments.

For example, returning to FIG. 3, a width W of the containment structure 302 is shown as extending circumferentially around the region of the volute 303. For example, the width W of the containment structure 302 may be equal to the circumferential width of the shroud 300. A thickness T of the containment structure 302 is shown as extending perpendicularly to the volute 303. In some examples, the position of the containment structure 302 may be centered in a thickness of the shroud 300 and/or volute wall (e.g., midway between the inner and outer shells). In other examples, the position of at least a portion of the containment structure 302 may be offset to be closer to one of the walls of the shroud 300 and/or volute than another one of the walls (e.g., closer to the inner shell than the outer shell and/or closer to the outer shell than the inner shell along the width of the containment structure 302). The thickness T may be an example of a configuration of the grid structure that is varied in different regions of the shroud 300. For example, the thickness T may be increased in regions that are most likely to receive high impacts from turbine wheel fragments or compressor wheel fragments. In examples where the energy and debris resulting from a failure of the wheel vary across specific areas of the case or volute, the lattice containment structure may exhibit varying degrees of density, thickness, and/or material in order to balance material usage, weight, cost, and/or other considerations with debris/energy absorption capacity. The thickness T may be increased by increasing a height/size of each pore of the grid (e.g., pores 406 of FIG. 4) in a targeted region, by increasing a thickness of the lines of material forming the grid (e.g., lines of material 404 of FIG. 4), and/or by increasing a number of pores of the grid in the direction of the thickness measurement. In some examples, the lattice density may be consistent throughout the containment structure 302 (e.g., to provide an even distribution of material across the containment structure). In other examples, the lattice density may vary throughout the radial thickness of the volute and/or case in order to maximize containment effectiveness in targeted areas (e.g., areas most likely to receive a greatest amount of energy and/or debris in the event of a turbine or compressor wheel failure). The outlet flange of the case may serve as a 2-wall containment in the area where the volute terminates.

As described briefly above, the remaining regions of the shroud 300 other than the containment structure 302 may be formed of substantially solid material. For example, a first region of solid material may extend from the inner shell 304 to the containment structure 302. A second region of solid material may extend from the containment structure 302 to the outer shell 306. The first and/or second regions of solid material may be thicker than the containment structure 302 in some examples. The shroud 300 may also include regions of mostly solid material extending past terminating ends 308a and 308b of the containment structure 302. For example, the containment structure 302 may form a curved shape (e.g., a "C" shape or inverted "C" shape) extending from the first terminating end 308a around a portion of the volute 303 of the turbocharger to the second terminating end 308b, and solid material may extend around the remaining portion of the volute 303 between the terminating ends of the containment structure. In some examples and/or regions of the shroud 300, the solid material may be interrupted in a region 309 between the terminating ends of the containment structure 302 in order to accommodate a nozzle ring or other turbocharger structure to allow air from the volute 303 to be directed to the turbine wheel for rotating the turbine wheel.

The portion(s) of solid material extending past the terminating ends of the containment structure and around remaining regions of the volute may include one or more voids 310 for accommodating other structures of the associated turbine case. For example, the voids 310 may provide a channel(s) for coolant flow through the turbine case.

Figure 5A:
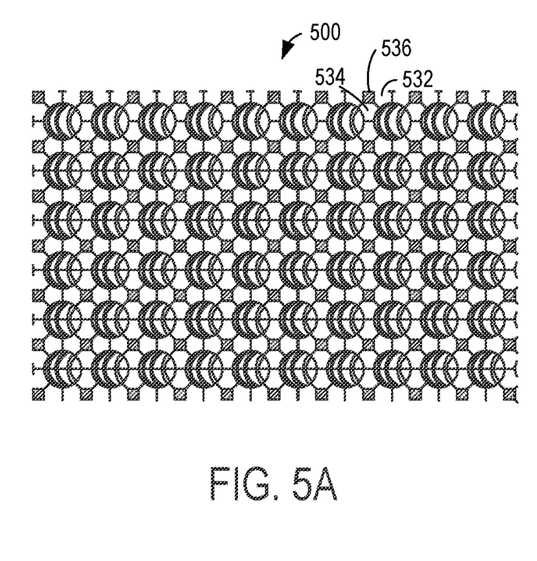
FIGS. 5A-5C show an example lattice structure incorporated within a turbine casing.
Figure 5B:
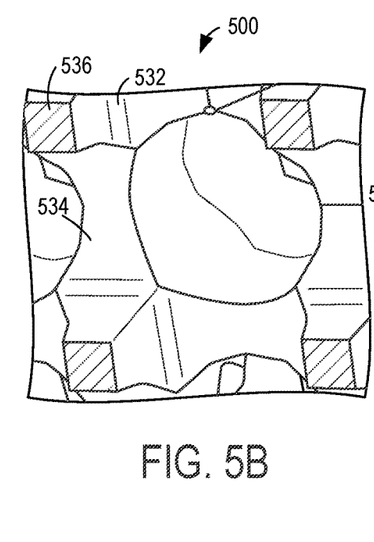
Figure 5C:
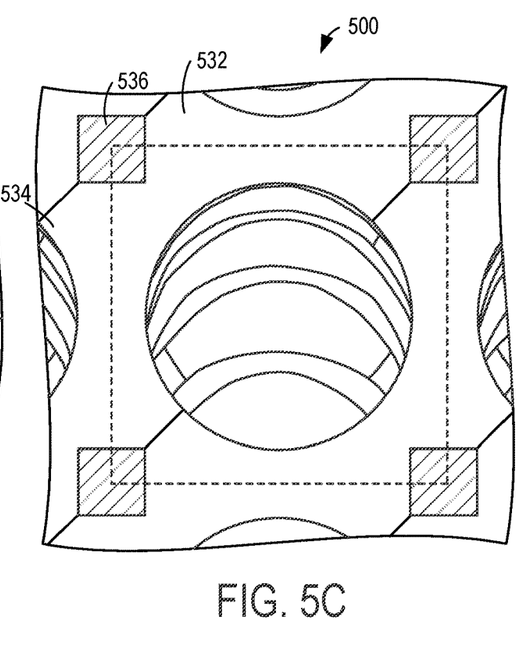

FIGS. 5A-5C show different views of a lattice structure 500 which may constitute at least certain portions of a turbocharger case, such as portions 232a-c of FIG. 2 and/or containment structure 302 of FIGS. 3 and 4. For example, FIG. 5A shows the lattice structure 500 at a first zoom level and orientation, FIG. 5B shows the lattice structure 500 at a second zoom level and orientation, and FIG. 5C shows the lattice structure 500 at a third zoom level and orientation, where the zoom level of FIG. 5A is lower (e.g., more zoomed out) than the zoom level of FIG. 5B, and the zoom level of FIG. 5B is lower than the zoom level of FIG. 5C. The lattice structure 500 forms a three-dimensional (3D) grid or matrix of parallel and intersecting lines of material. The material of the macro lattice may be uniform in size, shape, spacing, and/or distribution throughout the entire structure in some examples. In other examples, the material of the macro lattice may be non-uniform in size, shape, spacing, and/or distribution in at least a portion of the structure or throughout the entire structure. As used herein, the term "grid" or "matrix" may be understood to include a structure of solid lines of material that are uniform or non-uniform in size, uniform or non-uniform in shape, uniform or non-uniform in spacing, and/or uniform or non-uniform in distribution throughout the structure.

A plurality of horizontal lines 532 may intersect with vertical lines 534 at nodes 536 to form the grid. In some examples, lines of material forming the grid of the lattice structure may be equally spaced, thereby providing a uniform macro structure of pores. In other examples, the lines of material forming the grid of the lattice structure may be non-equally spaced, thereby providing a non-uniform macro structure of pores. The case and the lattice may be monolithic, where the lines may be three-dimensionally (3D)

printed with the material used for manufacturing the case and the pores may contain air. Example materials that may be used for printing the case and/or lattice include, but are not limited to, a nickel alloy, carbon steel, iron alloy, and stainless steel. For example, current additive materials may include nickel alloys and stainless steel due to laser compatibility, while sintered low carbon steels may be used for powders in examples where binder jet printing is performed. In some examples, the pores of the lattice may be injected, infused, infiltrated, and/or otherwise at least partially filled with a material other than air (e.g., in a post-printing operation) in order to add additional energy absorption capabilities. For example, a porous wall may be printed with a targeted thickness (e.g., as described above), and then a polymer, ductile metal, and/or other material (e.g., a material that absorbs energy better than air, which may additionally or alternatively include gelatinous or liquid materials) may be drawn into the pores of the wall thereby providing additional energy absorption capabilities.

Due to the 3D structure of the lattice, the structural integrity and strength may be higher than a solid structure even though the overall weight may be lower. Also, the interconnected grid allows effective heat transfer through the lattice structure. In this way, by fabricating portion of the case with a lattice structure, the overall weight of the case may be reduced while improving strength and heat transfer.

Accordingly, as described in more detail below, the case 205 may be manufactured using an additive manufacturing process such as 3D printing. By utilizing additive manufacturing, the complex case structure including portions of solid material, portions of intermittent solid material (e.g., forming a lattice structure), and open regions (e.g., forming openings for oil passageways and coolant passages, as well as openings for turbocharger components) may be manufactured in a fast and low-cost manner, without requiring multiple individual structures that are welded or otherwise fastened together, which may compromise structural integrity. Further, some parameters of the case structure, such as material thickness and/or spacing of material in the lattice regions, as well as the overall dimensions of the case, may be selected based on application-specific parameters. The use of additive manufacturing, as described herein, may accommodate such application-specific adjustments by adjusting the model of the case used as instructions for additive manufacturing, and without requiring completely different manufacturing equipment.

Figure 6:
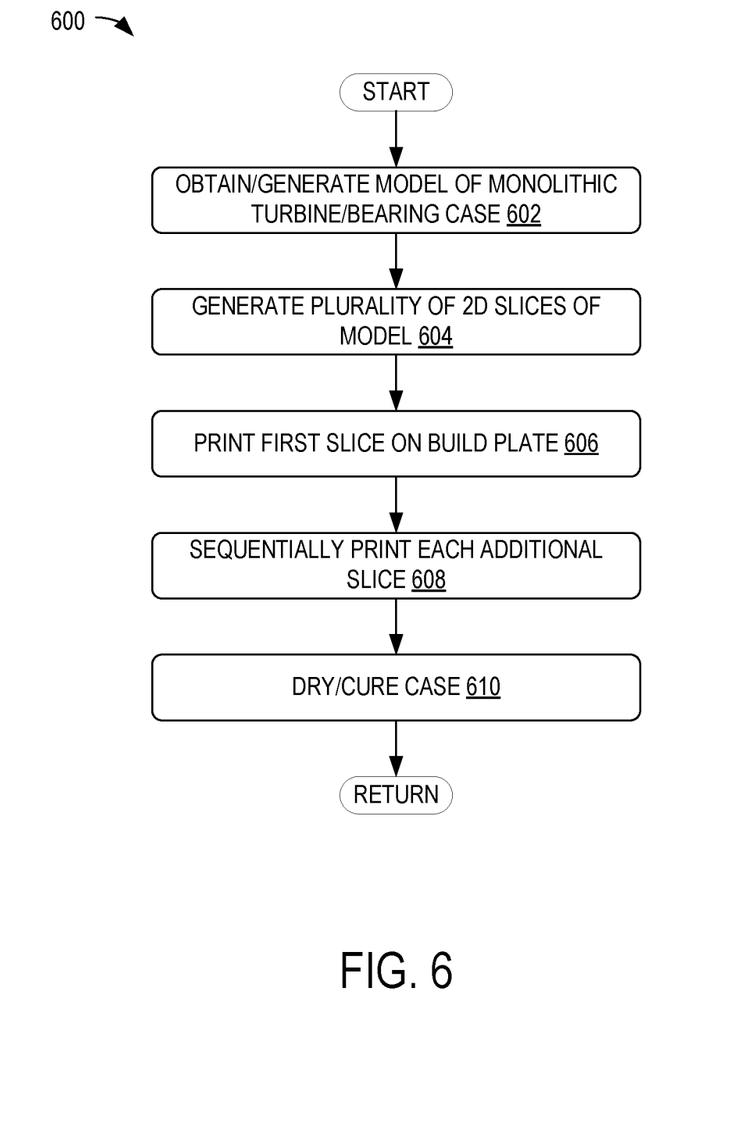
FIG. 6 shows a flowchart illustrating an example method for manufacturing a turbine casing.

An example method 600 for 3D printing a turbocharger case, such as case 205 of FIG. 2 (e.g., including shroud 300 of FIG. 3 and/or containment structure 302 of FIGS. 3 and 4), is illustrated in FIG. 6. At 602, the method includes obtaining or generating a 3D model of the case. The model of the case may be a computer aided design (CAD) file, additive manufacturing file (AMF), or other 3D modeling file. The 3D model of the case may be generated on a printer-interfacing computing device. In some examples, the 3D model may be generated entirely from operator instructions via the CAD or other program. In other embodiments, the 3D model may be generated at least in part from information received from a 3D scanner (e.g., a laser scanner) that may image a physical model of the case. The 3D model may define the dimensions of the case, exterior and interior structures of the case, and material properties of the case, thereby fully representing, in a digital format, the final form of the case that will be produced. As appreciated by FIGS. 2-5C, for example, the case includes voids (e.g., empty space) and thus the 3D model of the case may include support structures, fill material, or other features that allow for printing over the voids. The 3D model may include the base portion of the case and/or the interior filter in order to produce a case that includes the base portion and/or interior filter integrated with the meshwork of the case. In other embodiments, the base portion and/or interior filter may be manufactured separately from the meshwork of the case, and thus may not be included in the 3D model.

At 604, the method includes generating a plurality of 2D slices of the 3D model of the case. The slices may be generated on the printer-interfacing computing device and then the plurality of slices are sent to the printing device as an STL file, or the 3D model of the case may be sent to the printing device, and the printing device may slice the 3D model into the plurality of slices to generate an STL file. In doing so, the 3D model may be sliced into hundreds or thousands of horizontal layers of a suitable thickness, such as a thickness in a range from 0.1 mm to 3 mm. The total number of layers or slices may be based on a thickness of the case, a material used for the printing, and/or user selection. At 606, the method includes printing, with the printing device, the first slice on a build plate or other suitable base material. When the printing device prints from the STL file, the printing device creates or prints the case layer-by-layer on the build plate. Accordingly, at 608, the method includes sequentially printing each additional slice of the 3D model. For example, the printing device may read every slice (or 2D image) from the 3D model and proceed to create the 3D case by laying down (or printing) successive layers of material on an upper, planar surface of the build plate until the entire case is created. Each of these layers can be seen as a thinly sliced horizontal cross section of the eventually completed or printed 3D case.

The printing device may be a suitable device configured to print metal and/or other high magnetic permeability materials, such as aluminum or stainless steel. The printing device may utilize selective laser melting (SLM) technology, direct metal laser sintering (DMLS) technology, or other suitable metal printing technology. In some examples, the printing device may be configured to print multiple materials (e.g., the material for the case and fill material for voids of the case; and/or material for different regions of the case) and thus may include more than one print head.

During printing, the print head(s) is moved, in both horizontal and vertical directions, to complete or print each layer of the 3D model, by a controlled mechanism that is operated by control software running on the printing device, e.g., a computer-aided manufacturing (CAM) software package adapted for use with the printing device. The build plate is typically stationary with its upper planar surface parallel to a horizontal plane, although in some examples the build plate may be moved up and down vertically (i.e., in the z-direction). The printed material solidifies to form a layer (and to seal together layers of the 3D case), and the print head or build plate is then moved vertically prior to starting the printing of the next layer. This process is repeated until all layers of the 3D case have been printed.

At 610, the method includes drying and/or curing the case. For example, the printing process may include one or more drying and/or curing stages, which may include drying and/or curing each layer after the respective layer is printed and/or drying and/or curing the printed case after all layers are printed. The printed material may be cured by exposure to heat or UV radiation and allowed to harden (e.g., fully or partially). After drying/curing, any fill material used may be removed. For example, if a fill material is printed in the voids, the case may be placed into water, acid, or other solvent to dissolve the fill material. In another example, if support structures are printed in the voids (e.g., scaffolding-like structures or perforated structures), the support structures may be removed manually and/or with a tool. In some examples, the entire case may be printed as a single component, while in other examples, the 3D model of the case may include multiple 3D models, each of a different section of the case.

The method 600 provides an example for manufacturing the monolithic turbine and bearing case of the present disclosure using additive manufacturing technology, such as 3D printing. In an example, the monolithic turbine and bearing case described herein may be manufactured according to a computer readable medium including computer readable instructions which, when executed on a 3D printer or associated computing device, cause the printer to print the monolithic turbine and bearing case. It is to be understood that the example additive manufacturing process described in FIG. 6 is just one example of manufacturing the monolithic case of the present disclosure, and other manufacturing processes may be used in addition to or as an alternative to the method 600. For example, all or a portion of the monolithic case of the present disclosure may be manufacturing using a mold. The mold may be generated by first 3D printing a model of the case in a suitable material that may be solid at room temperature but changes to liquid at a relatively low temperature that is greater than room temperature, such as wax. A plaster mold may be formed over the wax model, and after the plaster dries, the wax may be melted and drained from the mold. The mold may then be filled with molten metal. Once the metal cools, the plaster may be removed to generate the monolithic case. As another example, the monolithic case may be manufactured using subtractive manufacturing technology. For example, as described briefly above, one or more lasers or other etching or subtractive mechanisms may be controlled by a computing device to selectively melt or otherwise remove material from a base structure in order to form a case having the overall dimensions and interior features of the monolithic turbine and bearing case described herein (e.g., based on a 3D model of the case, generated as described above). As still another example, the case may be formed by stack lamination, in which different layers of the case are formed independently by a process such as photolithography, and the layers are stacked and laminated to fuse the layers together. It is to be understood that any combination of 3D manufacturing techniques may be combined to produce the monolithic turbine and bearing case of the present disclosure.

As discussed above, the 3D printing process may utilize one or more materials for building the structure of the case and/or for building optional support structures within the case. For example, the material used to build the structure of the case may have different (e.g., higher) thermal properties (e.g., melting point) and/or other parameters (e.g., strength, rigidity, etc.) than the material used to build support structures in order to allow the support structures to be removed from the case. Furthermore, different regions of the case may be manufactured using different materials. For example, some regions of the case may be manufactured using material with higher elasticity/flexibility than other regions, higher porosity than other regions, higher density/strength than other regions, etc. In other examples, the entire case may be printed using the same material. As described above, examples of materials used for manufacturing the case include metal and/or other high magnetic permeability materials, such as aluminum or stainless steel. In other examples, materials used for manufacturing the case may include a nickel alloy (e.g., Inconel 718, which may be selected for advantageous high temperature properties), carbon steel, iron alloy, stainless steel, etc.

The disclosed approach of incorporating a 3D printed lattice structure in a shroud thus may eliminate add-on components and reduce part counts for turbocharger cases. A technical effect of the disclosed construction and associated method of manufacturing includes increasing a strength of the turbocharger case (e.g., by reducing joints or other vulnerabilities present in other constructions and by increasing a number of layers of material via the grid of the lattice structure). The disclosed approach may also reduce a weight of the shroud, due to the porous nature of the lattice structure, and decrease manufacturing cost, due to the 3D printing of a single structure, relative to other turbine case constructions that include containment add-on structures.

In some aspects, a case for a turbomachine includes a body that defines an interior cavity. The interior cavity is dimensioned to receive and house a turbomachine rotor, e.g., turbine or compressor. The body is additively manufactured, and includes an inner wall (defining the interior cavity) and an outer wall (defining an exterior of the body). Between the inner wall and the outer wall, the body includes a lattice structure as described elsewhere herein. The body, including the lattice structure, may be comprised of a metal material. The inner wall, outer wall, and lattice structure may be made of the same metal material. In another embodiment, the inner wall and the outer wall are made of the same metal material, whereas the lattice structure is made of a different metal material.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A turbomachine, comprising:
   a case;
   a rotor rotatably coupled to the case and configured to transfer energy between the rotor and a working fluid; and
   a shroud that is a part of the case, wherein the shroud houses the rotor, the shroud including an inner shell, an outer shell, and a lattice structure positioned between the inner shell and the outer shell, and wherein the case, including the shroud and the lattice structure, is a single; wherein a thickness of solid material extending perpendicularly between an inner and outer wall of the inner shell or outer shell is greater than a thickness of the lattice structure.

2. The turbomachine of claim 1, wherein the rotor comprises a compressor and the shroud is integrated with the case at a region of the case housing the compressor.

3. The turbomachine of claim 1, wherein the rotor comprises a turbine, and the shroud is integrated with the case at a region of the case housing the turbine.

4. The turbomachine of claim 3, wherein the inner shell forms a turbine volute of the turbine.

5. The turbomachine of claim 4, wherein the lattice structure extends partway around the volute, following a curvature of the volute.

6. The turbomachine of claim 4, wherein the lattice structure includes a three-dimensional grid of intersecting lines of material forming a plurality of pores, the three-dimensional grid being sandwiched between an inner layer of solid material and an outer layer of solid material.

7. The turbomachine of claim 6, wherein the inner layer of solid material and the outer layer of solid material follow the curvature of the turbine volute.

8. The turbomachine of claim 1, wherein the lattice structure is formed of the same material as the case.

9. The turbomachine of claim 1, wherein the shroud includes one or more voids for coolant flow through the shroud.

10. The turbomachine of claim 1, wherein the case and the shroud are formed as a single part via additive manufacturing.

11. The turbomachine of claim 1, wherein the lattice structure forms a curved shape extending from a first terminating end around a portion of a volute of the turbomachine to a second terminating end.

12. The turbomachine of claim 1, wherein a thickness of solid material extending perpendicularly between an inner and outer wall of the inner shell is greater than a thickness of the lattice structure.

13. The turbomachine of claim 1, wherein a thickness of solid material extending perpendicularly between an inner and outer wall of the outer shell is greater than a thickness of the lattice structure.

14. A turbocharger comprising:
a turbine case housing a turbine of the turbocharger;
a compressor case housing a compressor of the turbocharger; and
a bearing case housing one or more bearings of the turbocharger, wherein two or more of the turbine case, the compressor case, and the bearing case are integrally formed with one another, and the turbine comprising:
a turbine wheel; and
a shroud housing the turbine wheel, wherein the shroud is part of the turbine case, and wherein the shroud includes an inner shell, an outer shell, and a lattice structure positioned between the inner shell and the outer shell,
wherein the turbine case, including the shroud, and the lattice structure; wherein a thickness of solid material extending perpendicularly between an inner and outer wall of the inner shell or outer shell is greater than a thickness of the lattice structure.

15. The turbocharger of claim 14, wherein the inner shell forms a turbine volute of the turbine.

16. The turbocharger of claim 15, wherein the lattice structure extends partway around the volute, following a curvature of the volute.

17. The turbocharger of claim 15, wherein the lattice structure includes a three-dimensional grid of intersecting lines of material forming a plurality of pores, the three-dimensional grid being sandwiched between an inner layer of solid material and an outer layer of solid material.

18. A turbine case configured to house a turbine of a turbocharger of an engine system, the turbine case comprising:
a shroud configured to house a turbine wheel of the turbine, the shroud including an inner shell, an outer shell, and a lattice structure positioned between the inner shell and the outer shell, the lattice structure forming a curved shape extending from a first terminating end around a portion of a turbine volute of the turbocharger to a second terminating end,
wherein the turbine case, including the shroud, and the lattice structure; wherein a thickness of solid material extending perpendicularly between an inner and outer wall of the inner shell or outer shell is greater than a thickness of the lattice structure.

19. The turbine case of claim 18, wherein the turbine case is formed as the single, monolithic structure without any joints and/or seams via three-dimensional printing.

20. The turbine case of claim 18, wherein the lattice structure includes a three-dimensional grid of intersecting lines of material forming a plurality of pores, the three-dimensional grid being sandwiched between an inner layer of solid material and an outer layer of solid material.

* * * * *